(12) United States Patent
Sun et al.

(10) Patent No.: US 10,700,910 B2
(45) Date of Patent: Jun. 30, 2020

(54) SINGLE CARRIER WAVEFORM DATA TRANSMISSION AND RECEPTION BASED ON CONFIGURABLE DFT WINDOW

(71) Applicant: QUALCOMM Incorporated, San Diego, CA (US)

(72) Inventors: Jing Sun, San Diego, CA (US); Tamer Kadous, San Diego, CA (US); Tao Luo, San Diego, CA (US); Xiao Feng Wang, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/003,456

(22) Filed: Jun. 8, 2018

(65) Prior Publication Data

US 2018/0367362 A1 Dec. 20, 2018

Related U.S. Application Data

(60) Provisional application No. 62/521,138, filed on Jun. 16, 2017.

(51) Int. Cl.
*H04L 27/34* (2006.01)
*H04J 1/00* (2006.01)
*H04L 27/26* (2006.01)
*H04L 5/00* (2006.01)

(52) U.S. Cl.
CPC ............ *H04L 27/34* (2013.01); *H04J 1/00* (2013.01); *H04L 27/2605* (2013.01); *H04L 27/2613* (2013.01); *H04L 27/2627* (2013.01); *H04L 27/2636* (2013.01); *H04L 5/0051* (2013.01)

(58) Field of Classification Search
None
See application file for complete search history.

(56) References Cited

U.S. PATENT DOCUMENTS

| | | | | |
|---|---|---|---|---|
| 8,693,560 | B2* | 4/2014 | Shimezawa | H04L 27/2607 375/219 |
| 9,780,915 | B2* | 10/2017 | Lorca Hernando | H04L 5/0007 |
| 10,256,952 | B2* | 4/2019 | Lomayev | H04J 13/0014 |
| 2008/0279124 | A1* | 11/2008 | Furueda | H04B 7/0617 370/280 |
| 2009/0122731 | A1* | 5/2009 | Montojo | H04L 5/1484 370/280 |
| 2011/0080967 | A1* | 4/2011 | Larsson | H04L 27/2607 375/260 |

(Continued)

Primary Examiner — Michael J Moore, Jr.
(74) Attorney, Agent, or Firm — Nerrie M. Zohn

(57) ABSTRACT

In order to maintain flexible system bandwidth and a flexible center frequency, without requiring a cyclic prefix or guard interval, a transmitter apparatus transmits a reference signal based on a single carrier waveform having a mixed symbol structure, in reference signal symbols using at least one of a cyclic prefix and a guard interval and transmits data based on the single carrier waveform without the cyclic prefix or the guard interval. The data may be based on input data processed using overlapping FFT windows, and an amount of overlap between the FFT windows may be configurable by the transmitter or the receiver. An apparatus receiving the downlink transmission comprising data based on a single carrier waveform may process the data based on overlapping FFT windows.

33 Claims, 14 Drawing Sheets

(56) References Cited

U.S. PATENT DOCUMENTS

| | | | |
|---|---|---|---|
| 2012/0020437 A1* | 1/2012 | Furudate | H04L 25/0204 375/316 |
| 2016/0112238 A1* | 4/2016 | Ling | H04B 10/50 375/261 |
| 2016/0278117 A1* | 9/2016 | Sahlin | H04B 7/2615 |
| 2016/0316445 A1* | 10/2016 | Abdi | H04L 27/2665 |
| 2017/0063489 A1* | 3/2017 | Kolze | H04L 1/0015 |
| 2017/0339697 A1* | 11/2017 | Park | H04L 5/0044 |
| 2018/0110058 A1* | 4/2018 | Hessler | H04W 72/1268 |
| 2018/0241603 A1* | 8/2018 | Jia | H04J 13/0062 |
| 2018/0254924 A1* | 9/2018 | Berardinelli | H04L 25/02 |
| 2018/0331870 A1* | 11/2018 | Sun | H04L 27/2607 |
| 2018/0367355 A1* | 12/2018 | Pan | H04L 27/2607 |
| 2019/0158331 A1* | 5/2019 | Pawar | H04L 5/0051 |
| 2019/0312765 A1* | 10/2019 | Sahlin | H04L 1/0057 |

* cited by examiner

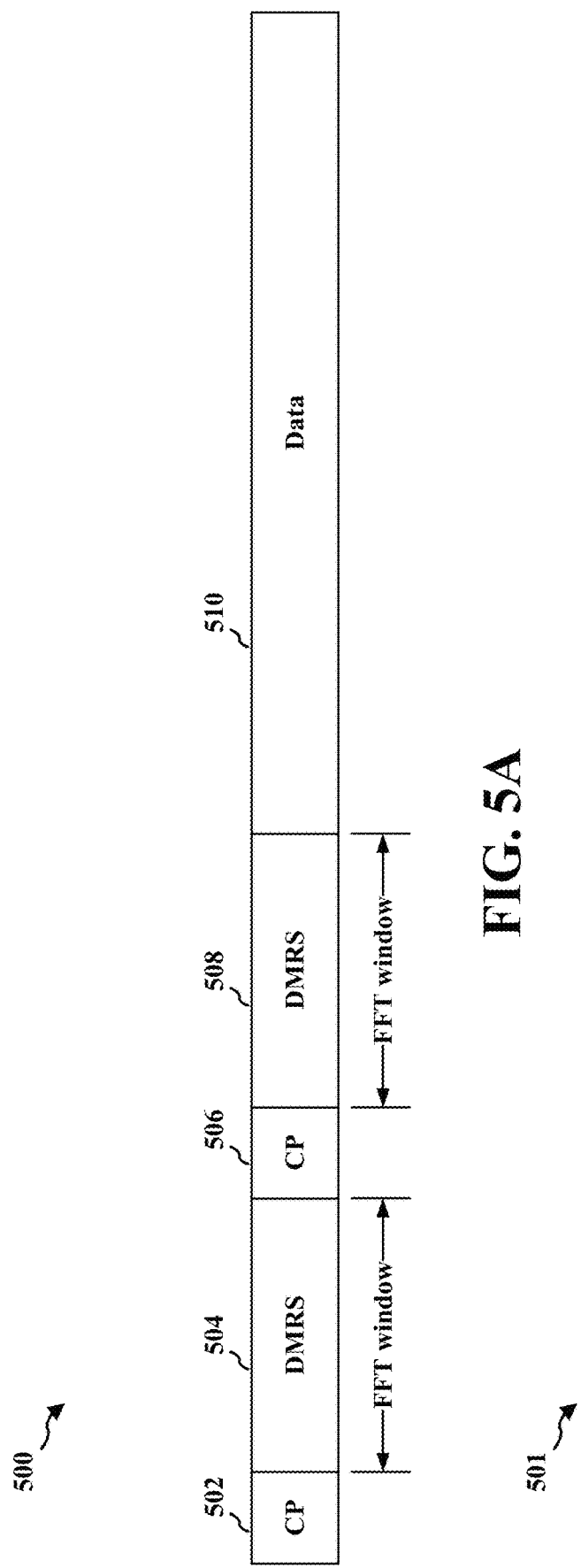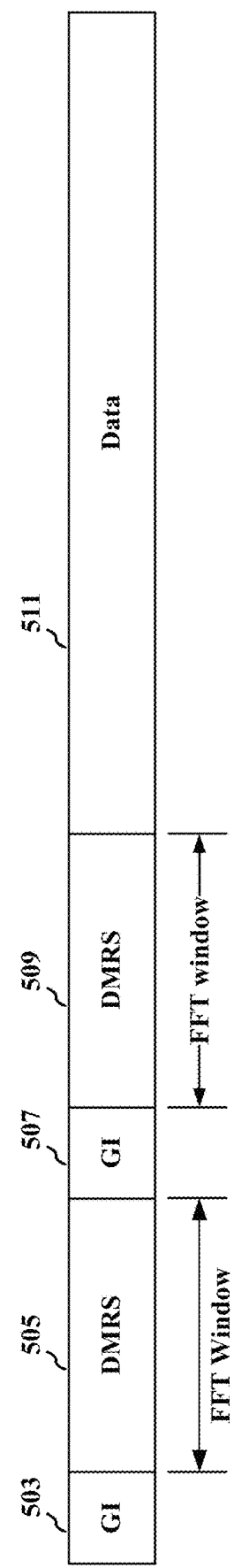
FIG. 5A
FIG. 5B

SINGLE CARRIER WAVEFORM DATA TRANSMISSION AND RECEPTION BASED ON CONFIGURABLE DFT WINDOW

CROSS-REFERENCE TO RELATED APPLICATION

This application claims the benefit of U.S. Provisional Application Ser. No. 62/521,138, entitled "Single Carrier Waveform Data Transmission and Reception Based on Configurable DFT Window" and filed on Jun. 16, 2017, which is expressly incorporated by reference herein in its entirety.

BACKGROUND

Field

The present disclosure relates generally to communication systems, and more particularly, to a transmission and reception of a single carrier waveform.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Single carrier waveforms such as Discrete Fourier Transform-Spread-Frequency-Division-Multiplexing (DFT-s-FDM) or Single Carrier-Quadrature Amplitude Modulation (SC-QAM) may be used for downlink transmissions. A single carrier waveform may lack a natural DFT window. A cyclic prefix or guard interval may be introduced periodically into the transmitted single carrier waveform signal. The cyclic prefix or guard interval protects the transmission from experiencing inter-symbol interference (ISI) due to timing inaccuracies. The location of the cyclic prefix or guard interval may define the DFT window for the transmitter and/or receiver. However, the cyclic prefix or guard interval may require an added amount of overhead, e.g., that is discarded at the receiver.

Aspects presented herein provide the benefits of a single carrier waveform, e.g., Discrete Fourier Transform-Spread-Frequency-Division-Multiplexing (DFT-s-FDM) or Single Carrier-Quadrature Amplitude Modulation (SC-QAM) while reducing the overhead required for a periodic cyclic prefix or guard interval. For example, the single carrier waveform may be based on a mixed symbol structure in which a portion of the signal is transmitted with a cyclic prefix or guard interval and another portion of the signal is transmitted without a cyclic prefix or guard interval. For example, single carrier waveform data may be transmitted without a cyclic prefix or guard interval while another part of the signal is transmitted with a cyclic prefix or guard interval. For example, reference signals may be transmitted using a cyclic prefix or guard interval. Thus, the reference symbols may comprise a fixed DFT window, e.g., based on a defined cyclic prefix or guard interval. Without a cyclic prefix or guard interval, there may be no defined DFT window length. Thus, a configurable DFT window length may be used for the portion of the signal that is transmitted with the cyclic prefix or guard interval, e.g., the data signal. The data signal, e.g., may be generated using overlapping Fast Fourier Transform (FFT) windows based on the configurable DFT window. The transmission of a single carrier waveform having the mixed symbol structure presented herein may reduce the overhead required by the cyclic prefix or guard interval while maintaining at least some of the flexible system bandwidth and flexible center frequency of the single carrier waveform.

In an aspect of the disclosure, a method, a computer-readable medium, and an apparatus are provided for wireless communication at a transmitter based on a mixed symbol structure. The apparatus transmits a reference signal based on a single carrier waveform in reference signal symbols using at least one of a cyclic prefix and a guard interval. The reference signal may comprise a fixed Discrete Fourier Transform (DFT) window. The apparatus transmits data based on the single carrier waveform without the cyclic prefix or the guard interval. The data may comprise a configurable DFT window. The data may be received based on input data processed using overlapping Fast Fourier Transform (FFT) windows. A first FFT window may comprise input data comprised in a second, adjacent FFT window. An amount of overlap between the FFT windows may be configurable by the receiver or the transmitter.

In another aspect of the disclosure, a method, a computer-readable medium, and an apparatus are provided for wireless communication at a receiver based on a mixed symbol structure. The apparatus receives a reference signal based on the single carrier waveform in reference signal symbols having at least one of a cyclic prefix and a guard interval. The reference signal may comprise a fixed DFT window. The apparatus receives a transmission in symbols comprising data based on a single carrier waveform without the cyclic prefix or the guard interval. The data may comprise a configurable DFT window. The apparatus then processes the reference signal and data. The apparatus may process the data based on overlapping FFT windows. A first FFT window may comprise data comprised in a second, adjacent FFT window. An amount of overlap between the FFT windows may be configurable by the receiver or the transmitter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates a mixed symbol single carrier waveform structure without a periodic cyclic prefix in a data portion.

FIG. 5B illustrates a mixed symbol single carrier waveform structure without a periodic guard interval in a data portion.

DETAILED DESCRIPTION

Figure 1:
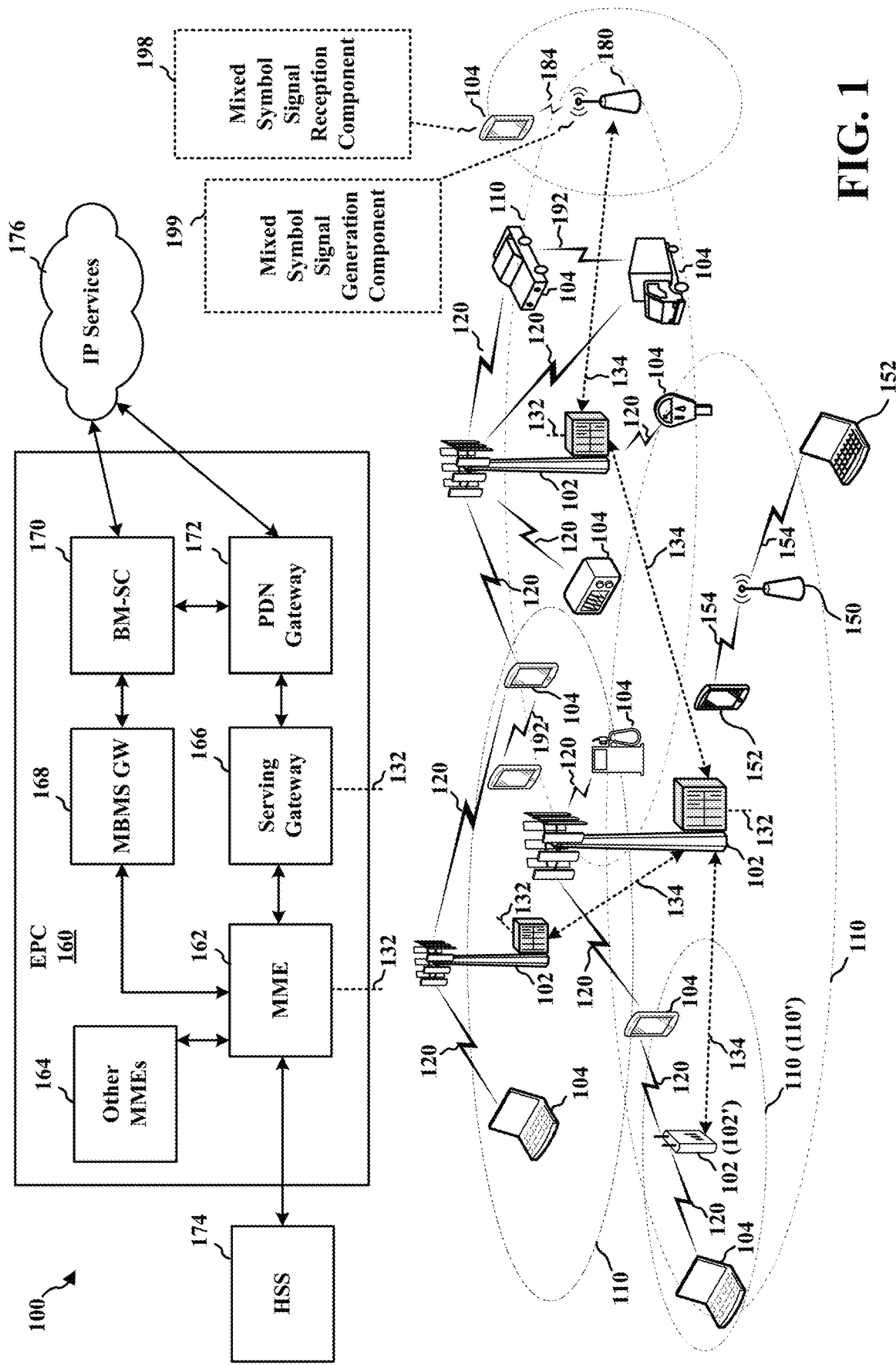
FIG. 1 is a diagram illustrating an example of a wireless communications system and an access network.
Figure 2:
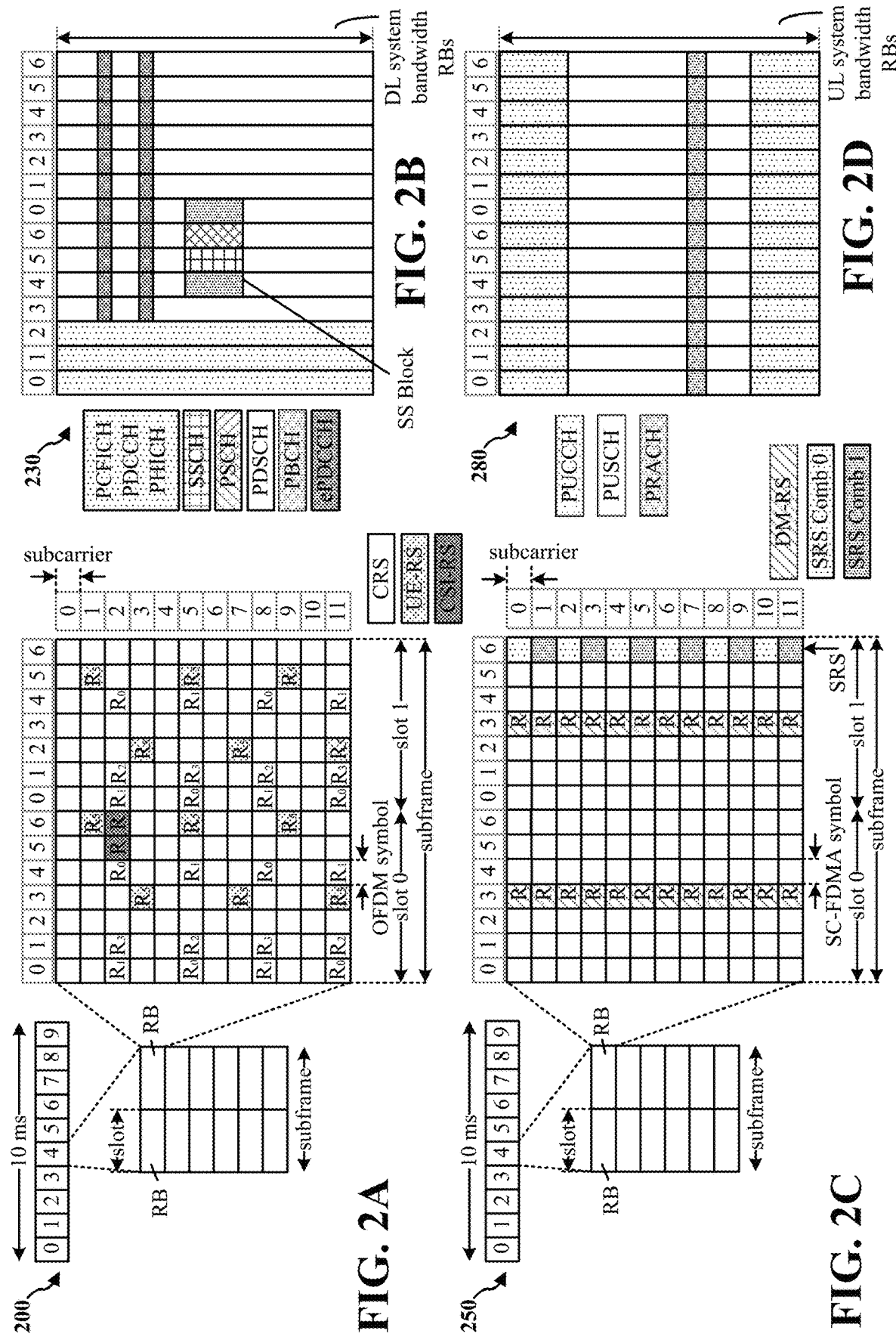
FIGS. 2A, 2B, 2C, and 2D are diagrams illustrating examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS)

Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may comprise a mixed symbol signal generation component 199 configured to introduce a periodic cyclic prefix or guard interval into reference symbols, wherein the reference signals comprise a fixed DFT window, and to transmit data without a cyclic prefix or guard interval and comprising a configurable DFT window. The UE 104 may be configured with a mixed symbol signal reception component 198 configured to receive and process a received signal having reference signals comprising a fixed DFT window, e.g., based on a cyclic prefix or guard interval and data comprising a configurable DFT window. For example, the mixed symbol signal component may process the data signal based on overlapping FFT windows. The base station and UE may include additional aspects, e.g., as described in connection with at least FIGS. 2A-14.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
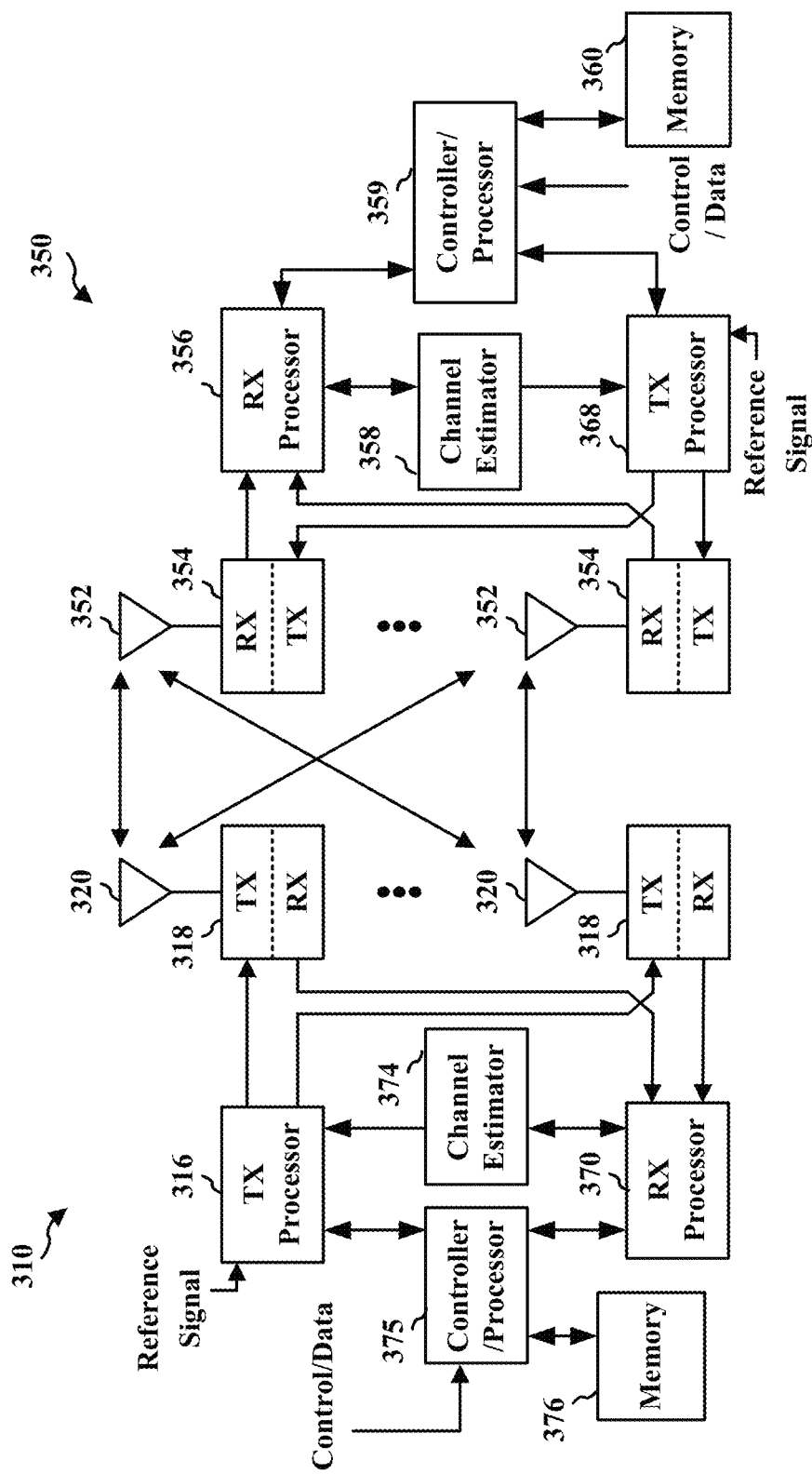
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4A:
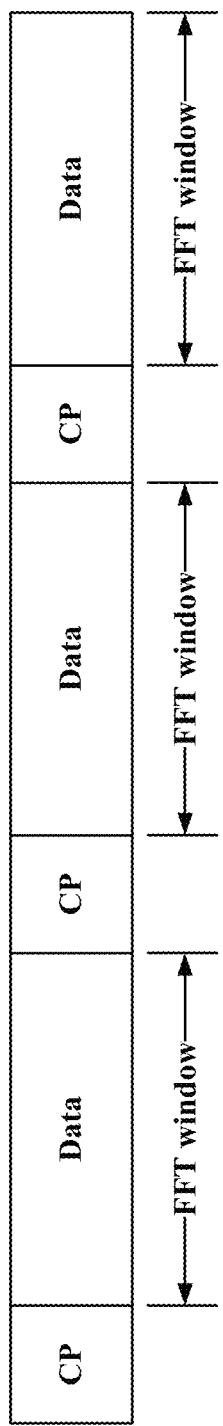
FIG. 4A illustrates a mixed symbol single carrier waveform structure including a periodic cyclic prefix.
Figure 4B:
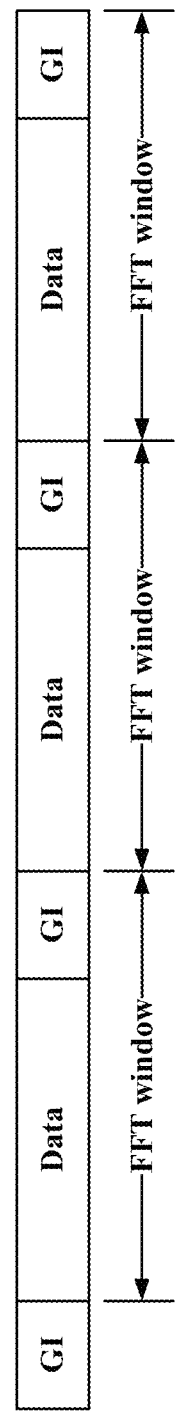
FIG. 4B illustrates a mixed symbol single carrier waveform structure including a periodic guard interval.

Single carrier waveforms such as DFT-s-FDM or SC-QAM may be used for downlink transmissions. A single carrier waveform may lack a natural DFT window. A cyclic prefix or guard interval may be introduced periodically. For example, FIG. 4A illustrates a DFT-s-FDM waveform 400 having a periodic cyclic prefix between data transmissions. FIG. 4B illustrates an example SC-QAM waveform 401 having a guard interval periodically introduced between data transmissions. The location of the cyclic prefix or guard interval naturally defines a DFT window for both the transmitter and for the receiver. The DFT window of the receiver will be consistent with that of the receiver. For example, in the DFT-s-FDM waveform 400, a DFT window begins at the end of the cyclic prefix and ends at the beginning of the next cyclic prefix. Similarly, if the SC-QAM waveform 401, a DFT window begins at the end of the guard interval and ends at the end of the next guard interval following the data transmission. The cyclic prefix or guard interval serves as a gap between adjacent data transmissions providing a cushion to avoid inter-symbol interference (ISI) due to timing inaccuracies. However, the periodic cyclic prefix or guard interval requires added overhead. The overhead required for the cyclic prefix or guard interval may be discarded at the receiver.

Aspects presented herein provide the benefits of a single carrier waveform while reducing the overhead required for a periodic cyclic prefix or guard interval. The aspects presented herein enable a reduction in overhead while balancing the need to avoid ISI and the need for a DFT window and maintaining at least some of the flexible system bandwidth and flexible center frequency of the single carrier waveform. For example, the single carrier waveform may transmit a portion of the signal, e.g., data, without a cyclic prefix or guard interval and another portion of the signal, e.g., reference signals, with a cyclic prefix or guard interval. FIGS. 5A and 5B illustrate examples of mixed symbol structures for single carrier waveforms, e.g., waveform 500 and waveform 501. Waveforms 500, 501 may comprise a cyclic prefix or guard interval in a portion of the signal, similar to waveforms 400, 401, yet without any cyclic prefix or guard interval introduced in the another portion of the signal, e.g., data transmission 510, 511. Without a cyclic prefix or guard interval in the data transmission 510, 511, there may be no defined DFT window length for the data. Thus, a configurable DFT window length may be used for the data. This mixed symbol structure may reduce the overhead required by the cyclic prefix or guard interval while maintaining at least some of the flexible system bandwidth and flexible center frequency of the single carrier waveform.

FIG. 5A illustrates a mixed symbol structure for a single carrier waveform 500 having reference signal symbols and data symbols. The single carrier waveform 500 may comprise DFT-s-FDM, for example. Reference signal portions 504, 508 of the waveform 500 comprises reference signal symbols. Portions 502, 506 of the waveform 500 comprise a cyclic prefix inserted with the reference signal portions 504, 508. For example, cyclic prefixes 502, 504 are illustrated surrounding reference signal portion 504. As well, cyclic prefix 506 is illustrated between reference signal portions 504 and 508. Data portion 510 of the waveform 500 comprises data symbols. The data transmission 510 may be transmitted without a cyclic prefix or guard interval introduced in the data transmission 510. This saves the overhead required for such cyclic prefix/guard interval. The reference signal, e.g., a DMRS signal, of the mixed symbol structure may have a cyclic prefix 502, 506 or guard interval 503, 507 introduced periodically in the reference signal symbols, e.g., reference signal portion 504, 506. FIG. 5A illustrates an example with cyclic prefixes 502, 504, introduced in the DMRS transmissions, e.g., reference signal portions 504, 506.

Reference signal portions 505, 509 of the waveform 501 comprises reference signal symbols. Reference signal portions 503, 507 of the waveform 501 comprises a guard interval inserted with the reference signal portions 505, 509. For example, guard intervals 503, 507 are illustrated surrounding reference signal portion 505. As well, guard interval 507 is illustrated between reference signal portions 505 and 509. Data portion 511 of the waveform 501 comprises data symbols. FIG. 5B illustrates an example mixed symbol structure for a single carrier waveform 501 similar to the waveform in FIG. 5A. However, the waveform 501 in FIG. 5B comprises guard intervals 503, 505 introduced periodically into reference signal, e.g., DMRS, transmissions, e.g., reference signal portions 505, 509. Similar to FIG. 5A, the data transmission 511 of FIG. 5B is transmitted without a guard interval. The single carrier waveform 501 in FIG. 5B may comprise, e.g., an 11ad waveform such as SC-QAM.

By introducing a cyclic prefix or guard interval in a portion of the mixed symbol structure, e.g., the portion comprising the reference signals, channel estimation can be protected from ISI through the cyclic structure having gaps between DMRS. By maintaining the quality of channel estimation through the use of cyclic prefix or guard intervals in the reference symbols, frequency domain equalization may be supported for the data portion 510, 511. While FIGS. 5A and 5B illustrate the reference signal portion positioned prior to a data portion, the reference signal may also be interlaced with the data portion.

In FIGS. 5A and 5B, the reference symbols comprise a fixed DFT window, e.g., defined by the cyclic prefix or guard interval. The data portion 510, 511 does not have a DFT/FFT window that is defined by cyclic prefixes/guard intervals, because the data portion 510, 511 is transmitted without introducing a cyclic prefix or guard interval. Thus, the DFT window, and therefore the FFT window, may be configurable for the data portion. The transmitter and receiver may use overlapping FFT windows in order to generate and receive the data signal. The overlapping FFT windows provide redundancy that assists the proper recovery of data, even if ISI is present.

Figure 6:
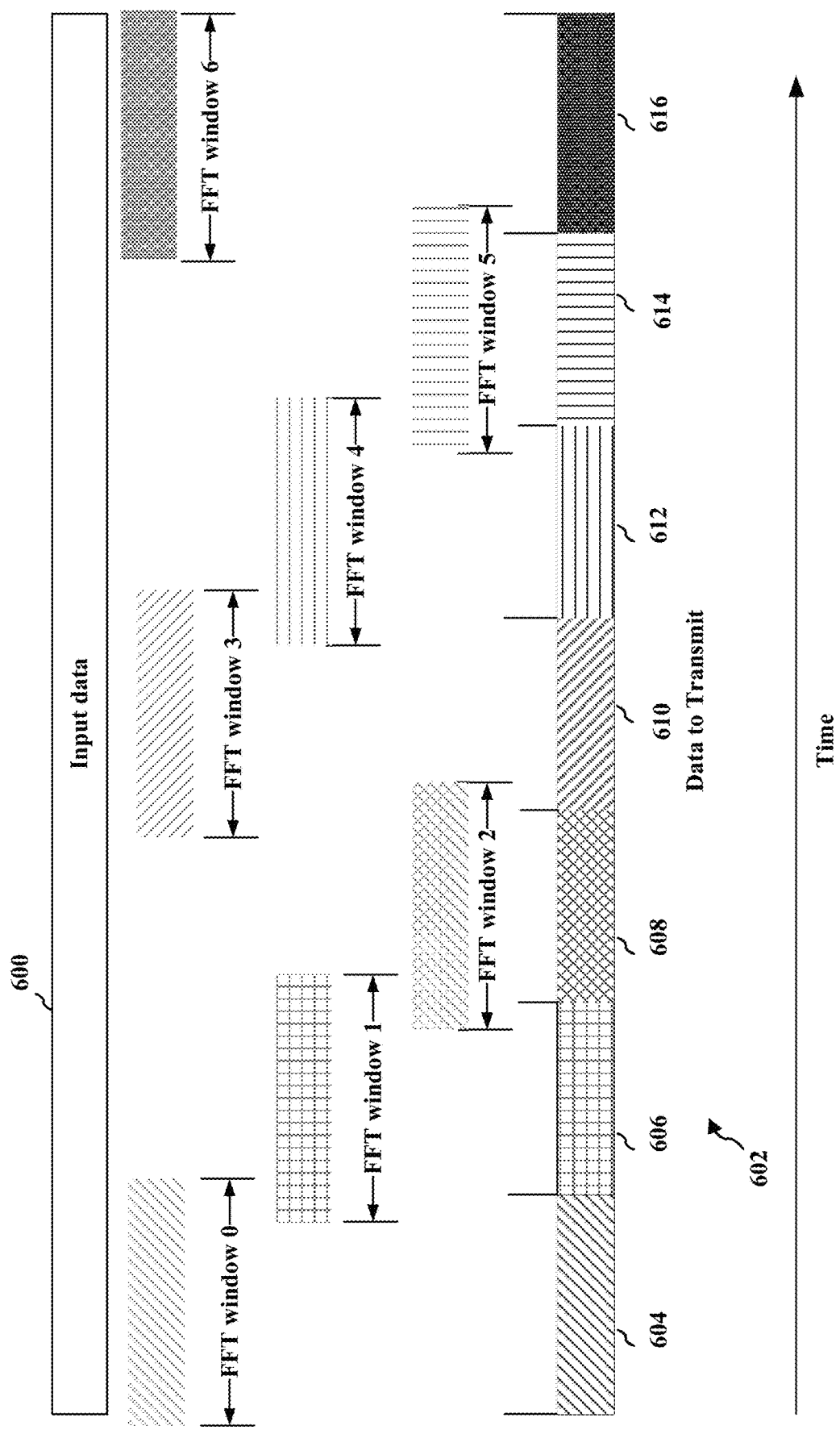
FIG. 6 illustrates data signal generating using overlapping FFT windows.

FIG. 6 illustrates the use of overlapping FFT windows in the generation of a data signal at a transmitter. The transmitter may be a base station (e.g., base station 180, 310, 804, 1350, the apparatus 1002, 1002'). A baseline single carrier waveform, e.g., DFT-s-FDM or SC-QAM, may be used for the signal, as described in connection with FIGS. 5A and 5B. The data may be transmitted without a cyclic prefix or guard interval. As illustrated, a DFT→tone mapping→Inverse DFT (IDFT) process may be used to over sample and upconvert the signal to the target subband. For example, in a first, DFT process, $N_1$ time domain samples may be processed through a size $N_1$ DFT, yielding $N_1$ frequency domain samples. Then, the $N_1$ frequency domain samples may be padded with $(N_2-N_1)$ zeros and mapped to $N_2$ tones. The zero-padded $N_2$ tones may then be processed through a size $N_2$ IDFT, yielding $N_2$ time domain samples. If the transmitter directly concatenated data symbols, there may be discontinuity at the symbol boundary. This was previously solved by windowing during the cyclic prefix or guard interval portion. As presented herein, the data portion can be transmitted without a cyclic prefix or guard interval. FIG. 6 illustrates that overlapping FFT windows of input data may be used in the DFT process to generate the data to transmit 602. FIG. 6 illustrates an example of overlapping FFT windows that include overlapping input data 600 to generate the data for transmission 602, including portions 604, 606, 608, 610, 612, 614, 616. For example, FFT window 1 includes overlapping input data 600 from preceding FFT window 0 and from subsequent FFT window 2. FFT window 2 includes overlapping input data from preceding FFT window 1 and from subsequent FFT window 3. FFT window 3 includes overlapping input data from preceding FFT window 2 and from subsequent FFT window 4, and so forth. Thus, the generated data signal for a particular FFT window will include overlapping input data also included in adjacent FFT windows. For example, data portion 606 corresponding to FFT window 1 will include overlapping data with data portions 604 and 608 corresponding to FFT window 0 and FFT window 2. Data portion 608 corresponding to FFT window 2 will include overlapping data with data portions 606 and 610 corresponding to FFT window 1 and FFT window 3. Data portion 610 corresponding to FFT window 3 will include overlapping data with data portions 608 and 612 corresponding to FFT window 2 and FFT window 4. Data portion 612 corresponding to FFT window 4 will include overlapping data with data portions 610 and 614 corresponding to FFT window 3 and FFT window 5, and so forth.

The overlapping part of the input data in each of the FFT windows may exceed the region affected by the boundary effect. The DFT/FFT window size and an amount of overlap between FFT windows may be configurable, e.g., by the base station, whereas the cyclic prefix or guard interval of the reference signal symbols may be preconfigured or fixed. Thus, picocells may use a smaller overlap between FFT windows in generating the data signal, because a picocells has a smaller radius and smaller timing inaccuracy than a larger cell that may use a larger overlap between FFT windows.

Figure 7:
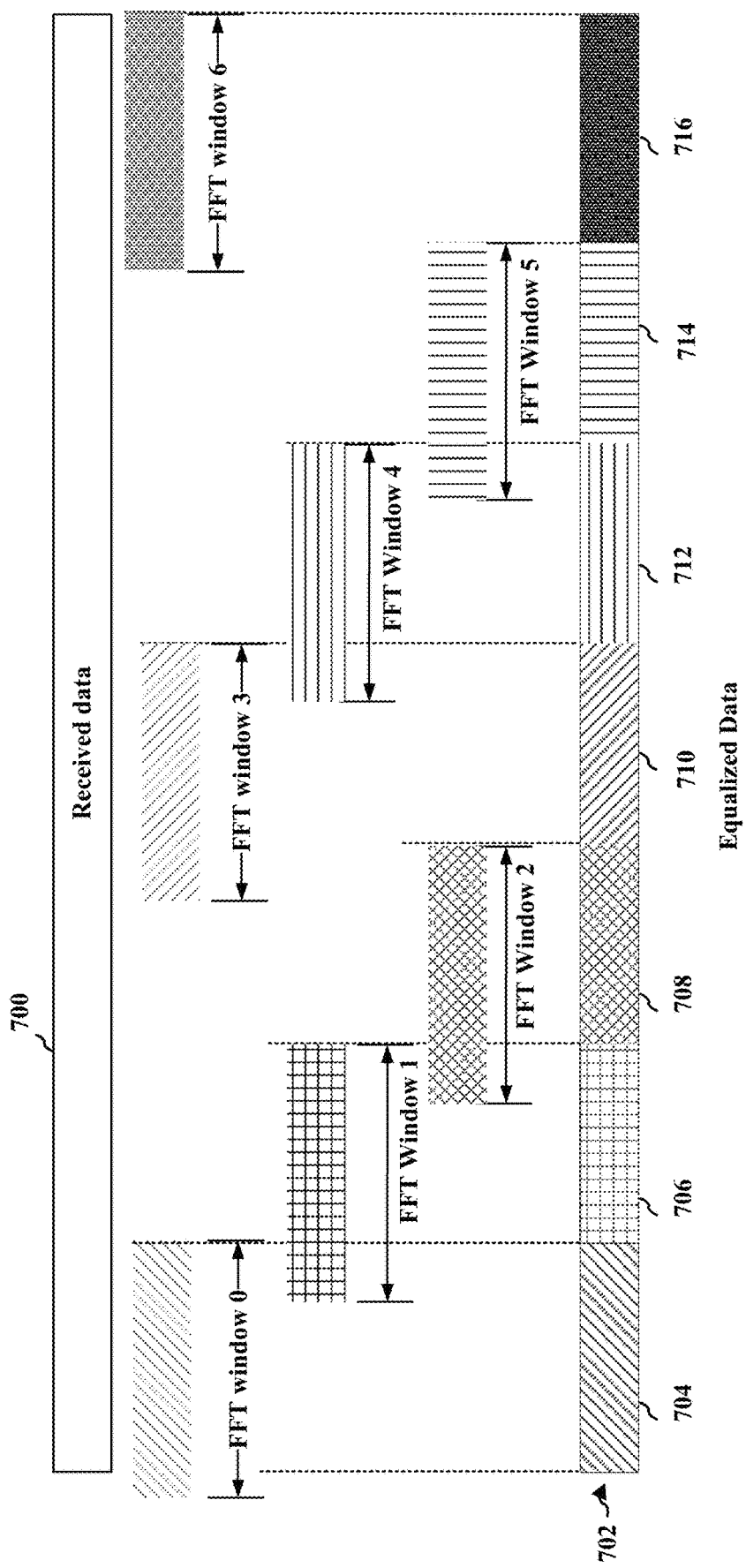
FIG. 7 illustrates data signal reception using overlapping FFT windows.

FIG. 7 illustrates the use of overlapping FFT windows in receiving a data signal at a receiver. The receiver may be a UE (e.g., UE 104, 350, 802). A baseline single carrier waveform, e.g., DFT-s-FDM or SC-QAM, may be used for the signal, as described in connection with FIGS. 5A and 5B. The data may be transmitted without a cyclic prefix or guard interval. The data may be generated using overlapping FFT windows, as described in connection with FIG. 6. Thus, the receiver may perform DFT processing. Without a cyclic prefix or guard interval, the beginning part of each FFT window may suffer from ISI. In order to reduce the effects of such ISI, the receiver may user overlapping FFT windows to process the received data signal.

In FIG. 7, the receiver receives data 700 and uses overlapping FFT windows of the received data to decode equalized data 702, e.g., decoded data. The decoded data 702 may correspond, e.g., to input data 600 in FIG. 6. The decoded data 702 may include portions 704, 706, 708, 710, 712, 714, 716. The receiver may buffer received data 700 during an FFT window and combine processing of adjacent FFT windows to decode the received data 700. As illustrated, FFT window 1 includes received data overlapping with adjacent FFT window 0 and FFT window 2. FFT window 2 includes received data overlapping with adjacent FFT window 1 and FFT window 3. FFT window 3 includes received data overlapping with adjacent FFT window 2 and FFT window 4, and so forth. Thus, the UE may process the received data 700 using the overlapping FFT windows, to decode the received data 700. The decoded data 702 may correspond, e.g., to input data 600 in FIG. 6.

The size of the FFT windows and the amount of overlap between FFT windows may be configurable, e.g., by the UE, whereas the cyclic prefix or guard interval of the reference signal symbols may be preconfigured or fixed. The size of the FFT window and the amount of overlap between the FFT windows used by the receiver may be different than an amount of overlap used by the transmitter to generated the data signal. The amount of overlap may be based on an amount of ISI experienced by the UE, and may be selected to exceed a region affected by the ISI. This may increase the number of FFT windows needed for the UE to process the data duration.

Figure 8:
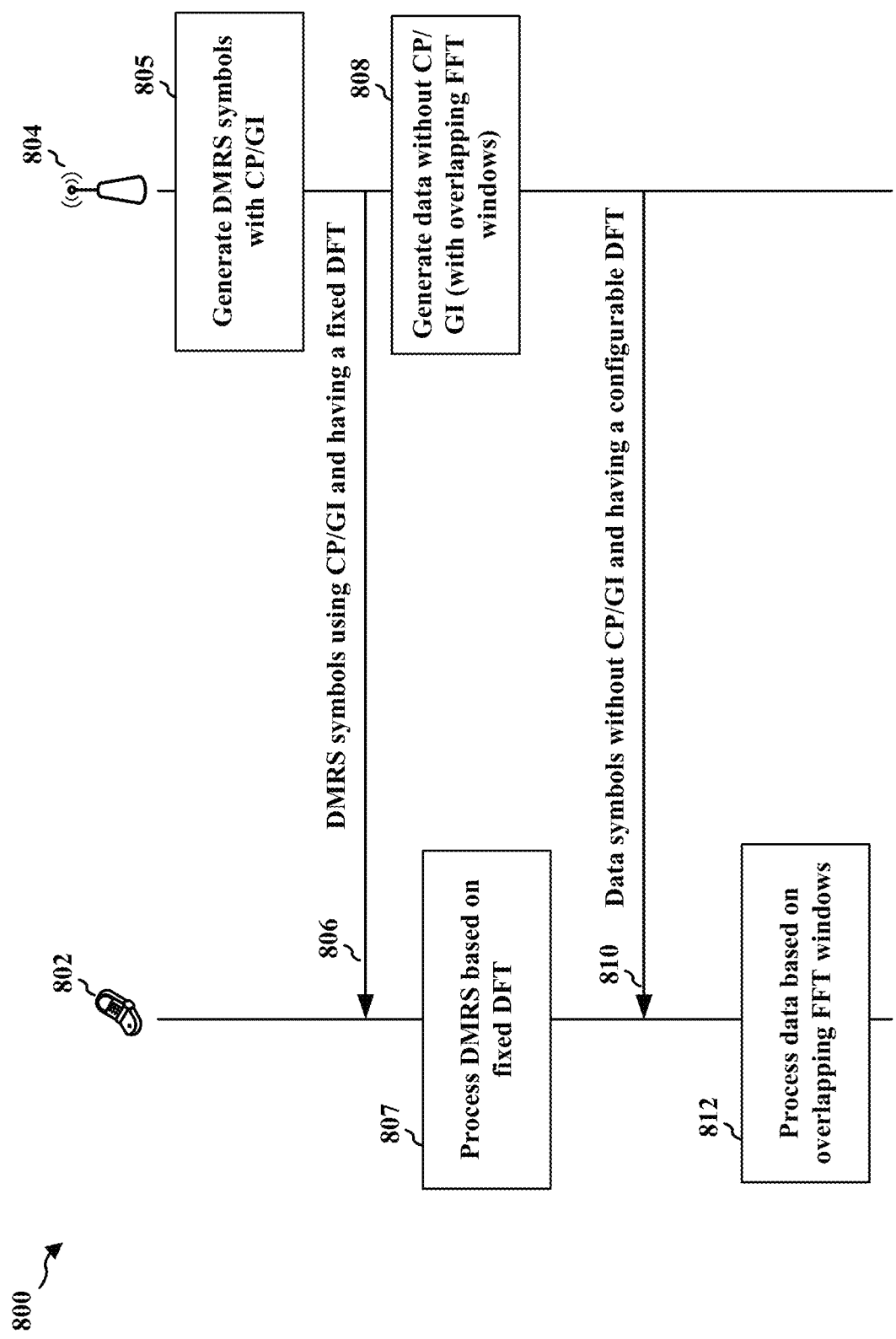
FIG. 8 illustrates an example signal flow of wireless communication between a base station and user equipment.

FIG. 8 illustrates a signal flow 800 between a UE 802 (e.g., UE 104, 350, 802,) and a base station 804 (e.g., base station 180, 310, 804). The base station 804 may transmit a single carrier waveform based on a mixed symbol structure, e.g., DFT-s-FDM, SC-QAM, etc. similar to the examples in FIGS. 5A, 5B. Although FIG. 8 illustrates a specific example between a base station and a UE, the aspects may be applied for any transmitter and receiver, e.g., for any transmitter transmitting a single carrier waveform comprising a reference signal and data.

At 805, the base station generates a DMRS having a periodic cyclic prefix or guard introduced into the reference signal symbols. For example, the waveform may comprise aspects similar to at least one of the example waveforms described in connection with FIGS. 5A and 5B. For example, at least one symbol comprising a cyclic prefix or a guard interval may be inserted with the generated DMRS. As illustrated in FIGS. 5A and 5B, the cyclic prefix or guard interval may be inserted before, after, and/or between DMRS symbols of a waveform.

After generating the DMRS symbols at 805, at 806, the base station transmits the reference signal symbols having the periodic cyclic prefix or guard introduced into the reference signal symbols. The transmission at 806 may comprise a waveform having aspects described in connection with the examples of FIGS. 5A and 5B. As described in connection with the generation of the DMRS at 805, the DMRS transmission may include symbol(s) having a cyclic prefix or guard interval inserted before, after, and/or between DRMS symbols.

At 807, the UE processes the DMRS based on the fixed DFT window size due to the cyclic prefix/guard interval. By introducing a cyclic prefix or guard interval in a portion of the mixed symbol structure, e.g., the portion comprising the reference signals, channel estimation at the UE can be protected from ISI, e.g., through the cyclic structure having gaps between DMRS. The reference signal may comprise a fixed DFT window. Thus, the receiver may use a fixed FFT window to process the DMRS. FIG. 7 illustrates an example use of overlapping FFT windows for a receiver in receiving a data signal. This is merely one example of an algorithm for processing the reference signal having the cyclic prefix and the guard interval. In other examples, the receiver may use a different algorithm to receive the reference signal, e.g., time domain up-sampling and filtering instead of performing FFT.

At 808, the base station generates the data symbols without a cyclic prefix or guard interval. For example, FIGS. 5A and 5B illustrate examples of data 510, 511 that is generated without a cyclic prefix or guard interval. The base station may generate the data symbols using overlapping FFT windows, as illustrated in FIG. 6.

At 810, the base station transmits the generated data symbols without a cyclic prefix or guard interval. Thus, the transmission of the single carrier waveform may be based on a mixed symbol structure, wherein the DMRS symbols use cyclic prefix or guard interval, but the data symbols do not use a cyclic prefix or guard interval. Additionally, the generation of the DMRS waveform may use fixed DFT/FFT window, whereas the generation of DATA waveform may employ a configurable DFT/FFT window.

As illustrated At 812, the UE 802 processes the data based on a configurable FFT window. For example, the UE may receive the data based on a configurable FFT window in one example. The UE may process the data based on overlapping FFT windows, as illustrated in FIG. 7. The FFT windows configured by the base station to generate the data symbols for transmission may be different than the FFT windows used by the UE to process the received data symbols.

Figure 9:
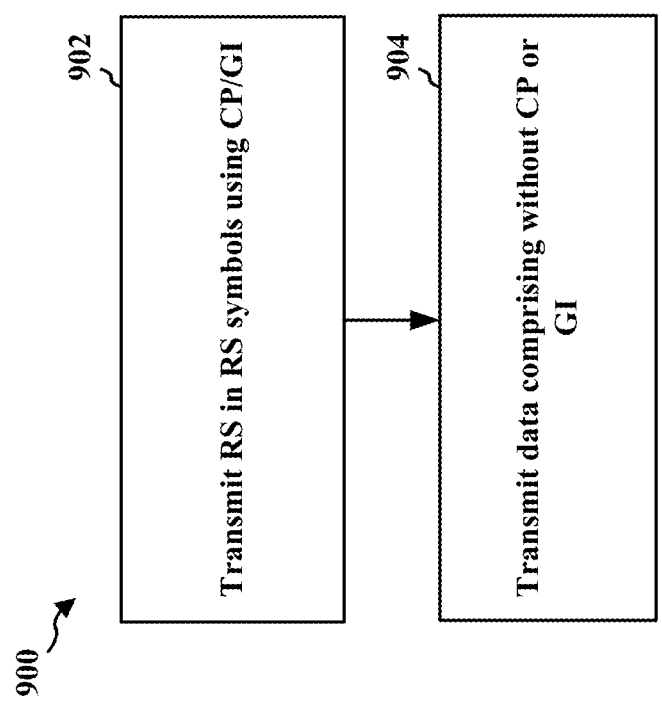
FIG. 9 is a flowchart of a method of wireless communication.

FIG. 9 is a flowchart 900 of a method of wireless communication. The method may be performed by a transmitter (e.g., the apparatus 1002, 1002') such as a base station (e.g., base station 180, 310, 804) communicating wirelessly with a receiver 1050 (e.g., the apparatus 1302, 1302'). The receiver may comprise a UE (e.g., UE 104, 350, 802). The aspects may be performed by any transmitter. Thus, the method may also be performed by a UE, e.g., (e.g., UE 104, 350, 802) that is transmitting, e.g., to a base station (e.g., base station 180, 310, 804). While the receiver 1050 is illustrated as a UE in FIG. 9, when the transmitter is a UE, the receiver 1050 may be a base station. The wireless communication between the transmitter and receiver may be based on a mixed symbol structure of a single carrier waveform. The single carrier waveform may comprise DFT-s-FDM or an 11ad waveform such as SC-QAM, such as described in connection with FIGS. 5A, 5B.

At 902, the transmitter transmits a reference signal 504, 505, 508, 509 based on a single carrier waveform in reference signal symbols using at least one of a cyclic prefix 502, 506 and a guard interval 503, 507. The reference signal may comprise a fixed DFT window, e.g., as described in connection with FIGS. 5A and 5B. The fixed DFT window may be based on the cyclic prefix or guard interval introduced into the reference signal symbols. The reference signal may comprise a DMRS, for example.

At 904, the transmitter transmits data based on the single carrier waveform without a cyclic prefix or a guard interval. The data may comprise a configurable DFT window, e.g., data 510, 511 as described in connection with FIGS. 5A, 5B, and 6. The data may be transmitted in data symbols without a cyclic prefix or a guard interval, e.g., as illustrated in FIGS. 5A and 5B.

The data may be based on input data processed using overlapping FFT windows, e.g., as described in connection with FIG. 6. For example, a first FFT window may comprise input data comprised in a second, adjacent FFT window. An amount of overlap between the FFT windows may be configurable by the transmitter or by the receiver. Thus, the transmitter or receiver can choose how much of an overlap is needed.

Figure 10:
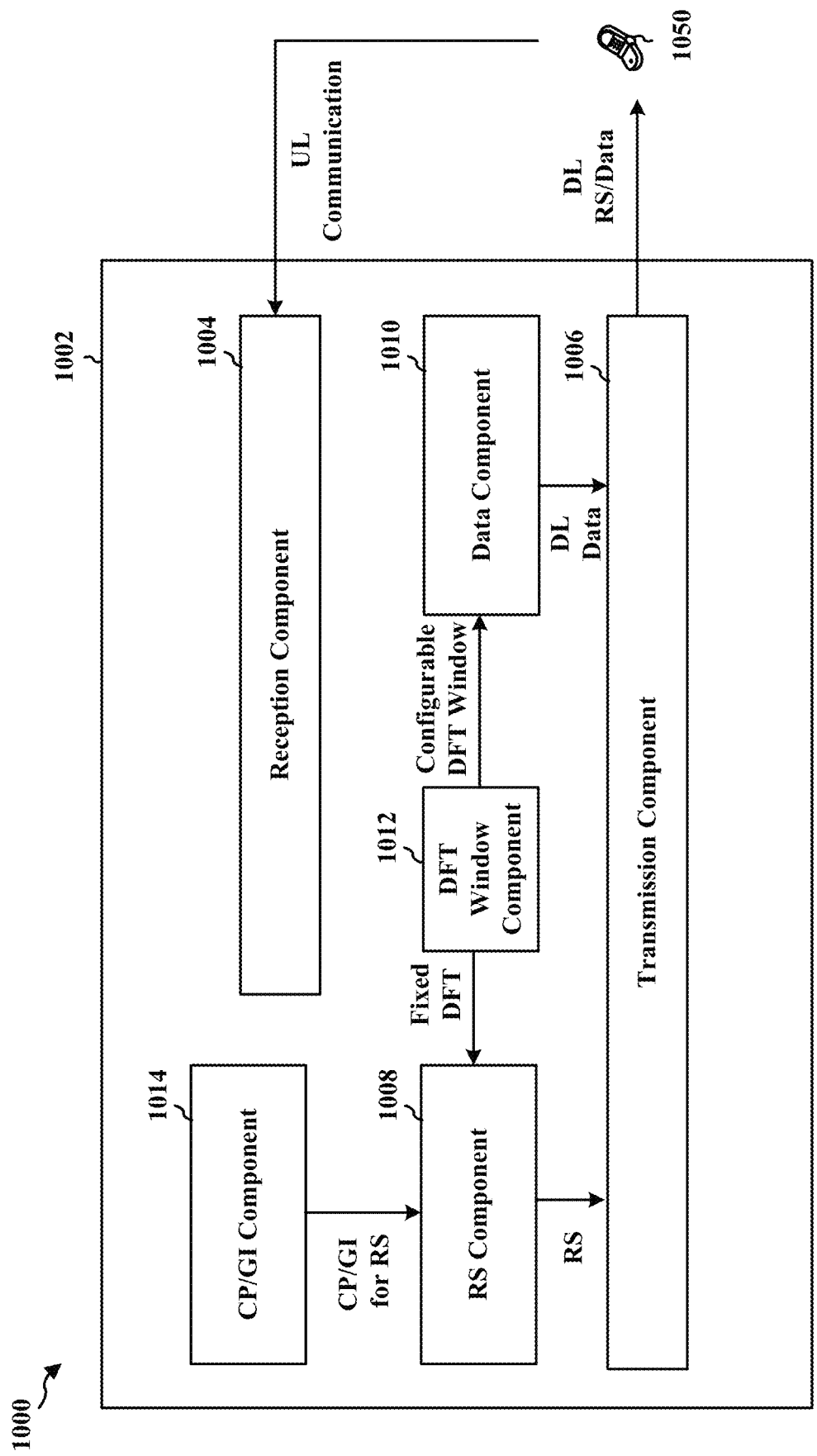
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be transmitter such as a base station (e.g., base station 180, 310, 804) or a UE (e.g., UE 104, 350, 802). The apparatus includes a reception component 1004 that receives communication from a receiver 1050. For example, if the apparatus comprise a base station, the reception component may receive uplink communication from a UE and a transmission component 1006 that transmits communication to receiver 1050. For example, if the apparatus comprise a base station, the transmission component may transmit DL communication to a UE. The communication may be transmitted using a mixed symbol structure of a single carrier waveform, e.g., such as DFT-s-FDM, SC-QAM, etc. The apparatus may include an RS component 1008 configured to transmit a reference signal based on a single carrier waveform in reference signal symbols using at least one of a cyclic prefix and a guard interval. The reference signal may comprise a fixed DFT window. The apparatus may comprise a data component 1010 configured to transmit data based on the single carrier waveform without a guard interval or a cyclic prefix. The data may comprise a configurable DFT window. The apparatus may include a DFT window component 1012 configured to provide the fixed DFT window for the reference symbols to reference signal component 1008 and to configure and provide the configurable DFT window, or FFT window, to the data component 1010. The data may be transmitted in data symbols without a cyclic prefix or a guard interval, while the reference signal symbols include a cyclic prefix or guard interval introduced periodically. Thus, the apparatus may include a CP/GI component configured to introduce the cyclic prefix or guard interval into the reference symbols for transmission.

The apparatus may include additional components that perform each of the aspects of FIGS. 6 and 7 and blocks of the algorithm in the aforementioned flowcharts of FIGS. 8 and 9. As such, each block in the aforementioned aspects of FIGS. 6 and 7 and the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
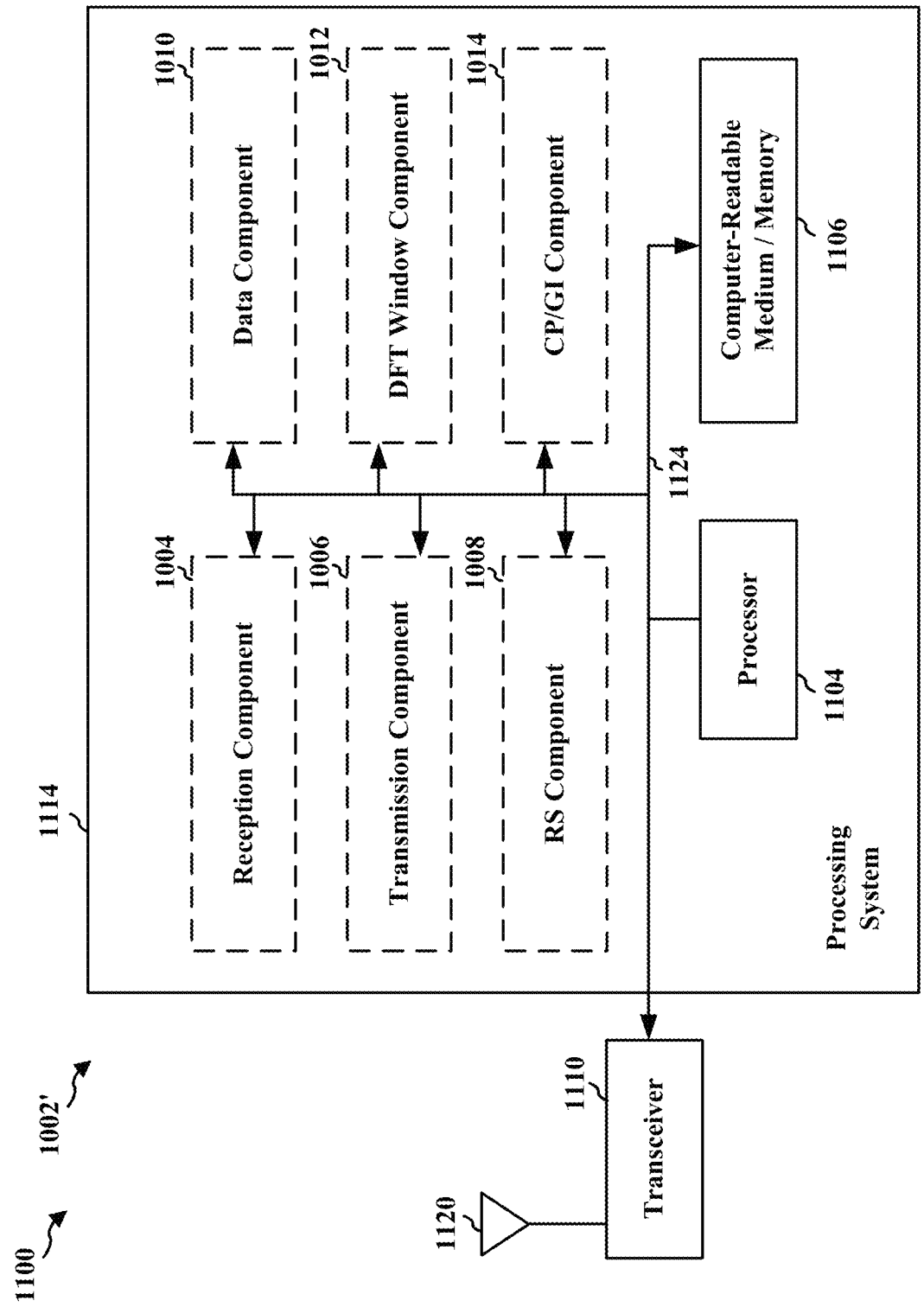
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for transmitting a reference signal based on a single carrier waveform in reference signal symbols using at least one of a cyclic prefix and a guard interval (e.g., 1006, 1008, 1014), and means for transmitting data based on the single carrier waveform without the cyclic prefix or the guard interval (e.g., 1006, 1010, 1012). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
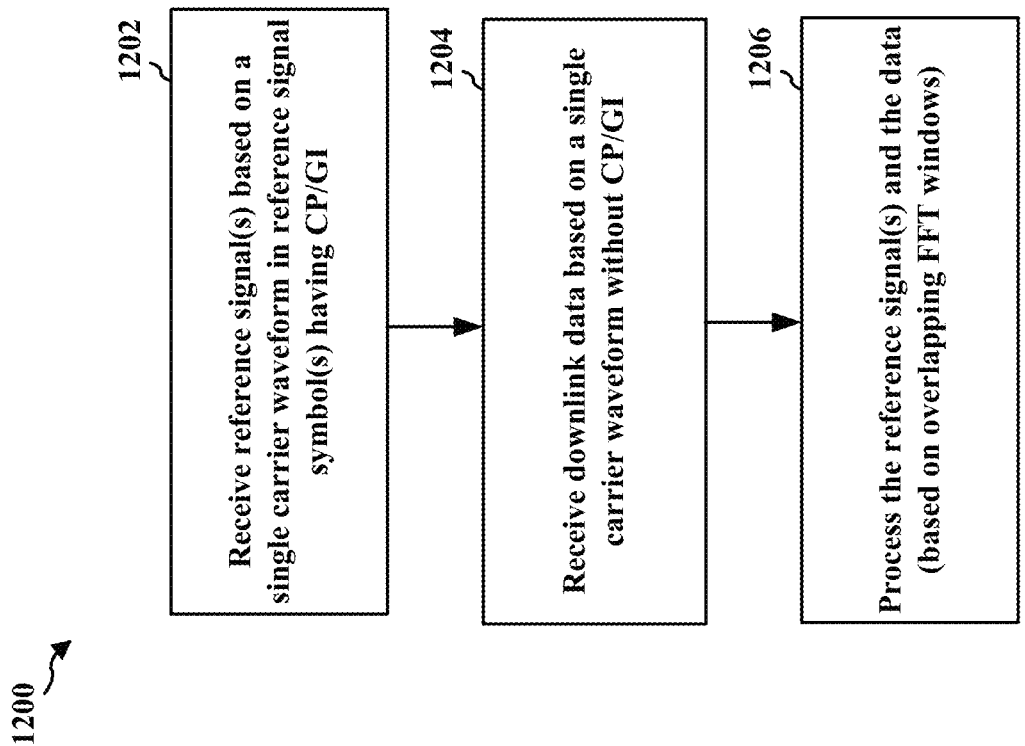
FIG. 12 is a flowchart of a method of wireless communication.

FIG. 12 is a flowchart 1200 of a method of wireless communication. The method may be performed by a receiver (e.g., receiver 1050, the apparatus 1302, 1302'). In one example, the receiver may comprise a UE (e.g., UE 104, 350, 802) receiving wireless communication from a base station (e.g., base station 180, 310, 804). In another example, the receiver may comprise a base station and the transmitter may comprise a UE.). The single carrier waveform may be based on a mixed symbol structure. The single carrier waveform may comprise DFT-s-FDM or an 11ad waveform such as SC-QAM, e.g., described in connection with FIGS. 5A, 5B.

At 1202, the receiver receives a reference signal based on the single carrier waveform in reference signal symbols having at least one of a cyclic prefix and a guard interval. The reference signal may comprise a fixed DFT window. This is merely one example of an algorithm for the reference signal having the cyclic prefix and the guard interval. In other examples, the receiver may use a different algorithm to receive the reference signal, e.g., time domain up-sampling and filtering instead of performing FFT. The reference signal may comprise a DMRS, and may be structured as illustrated in FIGS. 5A and 5B, for example.

At 1204, the receiver receives a transmission in data symbols comprising data based on the single carrier waveform without a cyclic prefix or a guard interval. The data transmission may comprise a configurable FFT window. The single carrier waveform may comprise a signal as described in connection with FIGS. 5A, 5B, and 6. The data may be received in data symbols without a cyclic prefix or a guard interval, e.g., as in the examples illustrated in FIGS. 5A and 5B.

At 1206, the receiver processes the reference signal and the data. For example, the reference signal may be processed based on the fixed DFT window, whereas the data may be processed based on a configurable FFT window. For example, the data may be processed at 1206 based on overlapping FFT windows, e.g., as described in connection with FIG. 7. For example, a first FFT window may comprise data comprised in a second, adjacent FFT window, as illustrated in FIG. 7. An amount of overlap between the FFT windows may be configurable by the receiver or by the transmitter. The amount of overlap may be based on a level of inter-symbol interference for the transmission. The amount of overlap between the FFT windows configured by the receiver to process the received data may be configured independently from a second amount of overlap configured by a transmitter.

Figure 13:
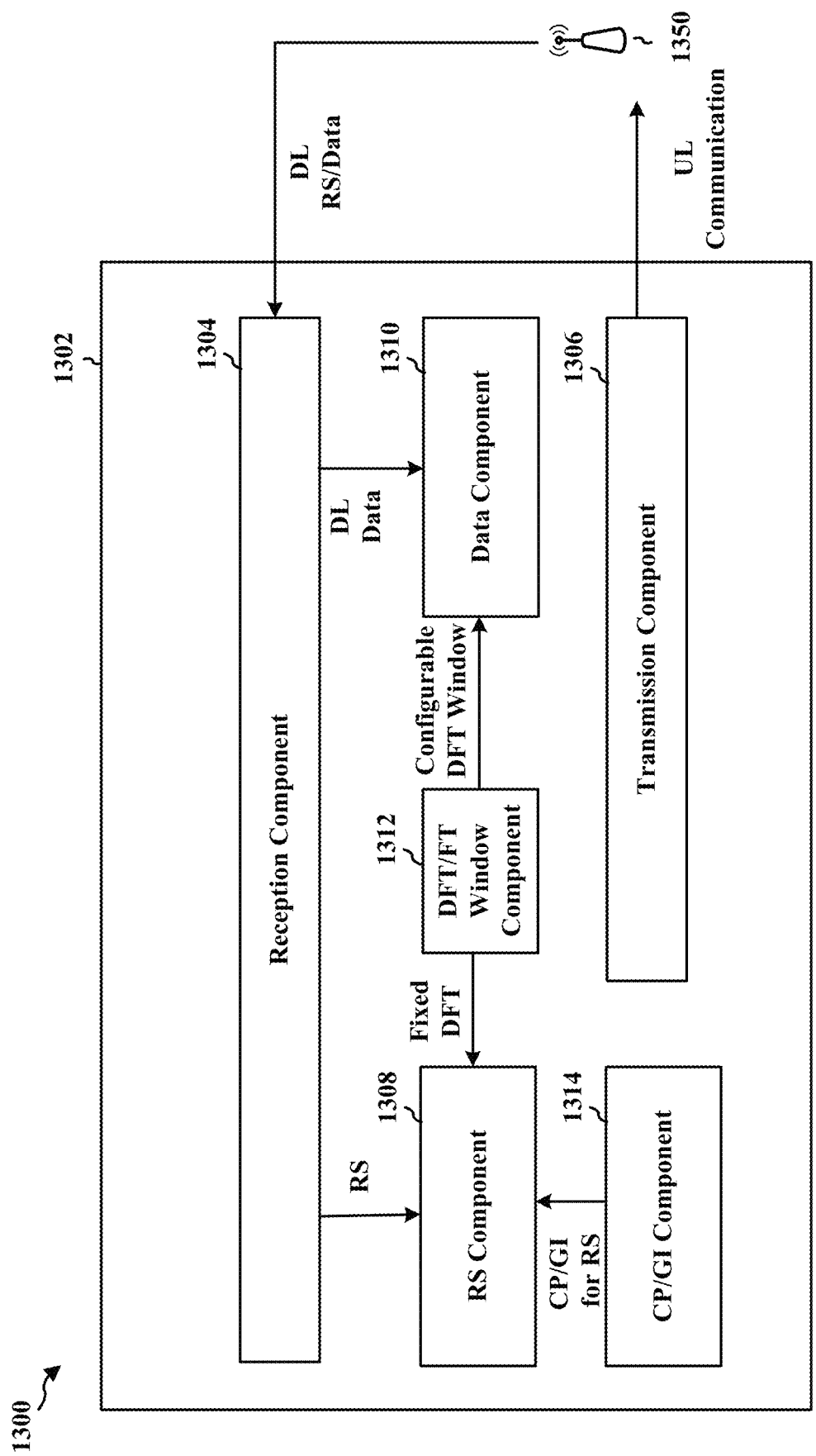
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a receiver (e.g., receiver 1050). The receiver may comprise a UE (e.g., UE 104, 350, 802). In another example, the receiver may comprise a base station (e.g., base station 102, 180, 310, 804). While transmitter 1350 is illustrated as a base station, when the receiver is a base station, the transmitter 1350 may be a UE. The apparatus includes a reception component 1304 that receives communication from a transmitter 1350, and a transmission component 1306 that transmits communication to the transmitter 1350. The wireless communication may be based on a mixed symbol structure of a single carrier waveform, e.g., DFT-s-FDM, SC-QAM, etc. The reception component 1304 may configured to receive a transmission comprising data based on a single carrier waveform without a guard interval or cyclic prefix. The data may comprise a configurable Fast Fourier Transform (FFT) window. The apparatus may include a data component 1310 configured to processing the data. The data may be processed based on overlapping FFT windows, as described in FIG. 7.

The apparatus may comprise an RS component 1308 configured to receive and process a reference signal based on the single carrier waveform in reference signal symbols having at least one of a cyclic prefix and a guard interval. The reference signal may comprise a fixed DFT window. The reference signal symbols may include a periodic cyclic prefix or guard interval, whereas the data may be transmitted without a cyclic prefix or guard interval. Thus, the apparatus may include a CP/GI component 1314 that assists the RS component 1308 in processing the reference symbols with introduced cyclic prefix or guard interval. The apparatus may also include a DFT/FFT window component 1312 that determines a fixed DFT window for the reference symbols and a configurable DFT/FFT window for the data.

The apparatus may include additional components that perform each of the blocks of the algorithm in the aforementioned flowcharts of FIGS. 8 and 12. As such, each block in the aforementioned flowcharts of FIGS. 8 and 12 and the aspects illustrated in FIGS. 5A, 5B, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
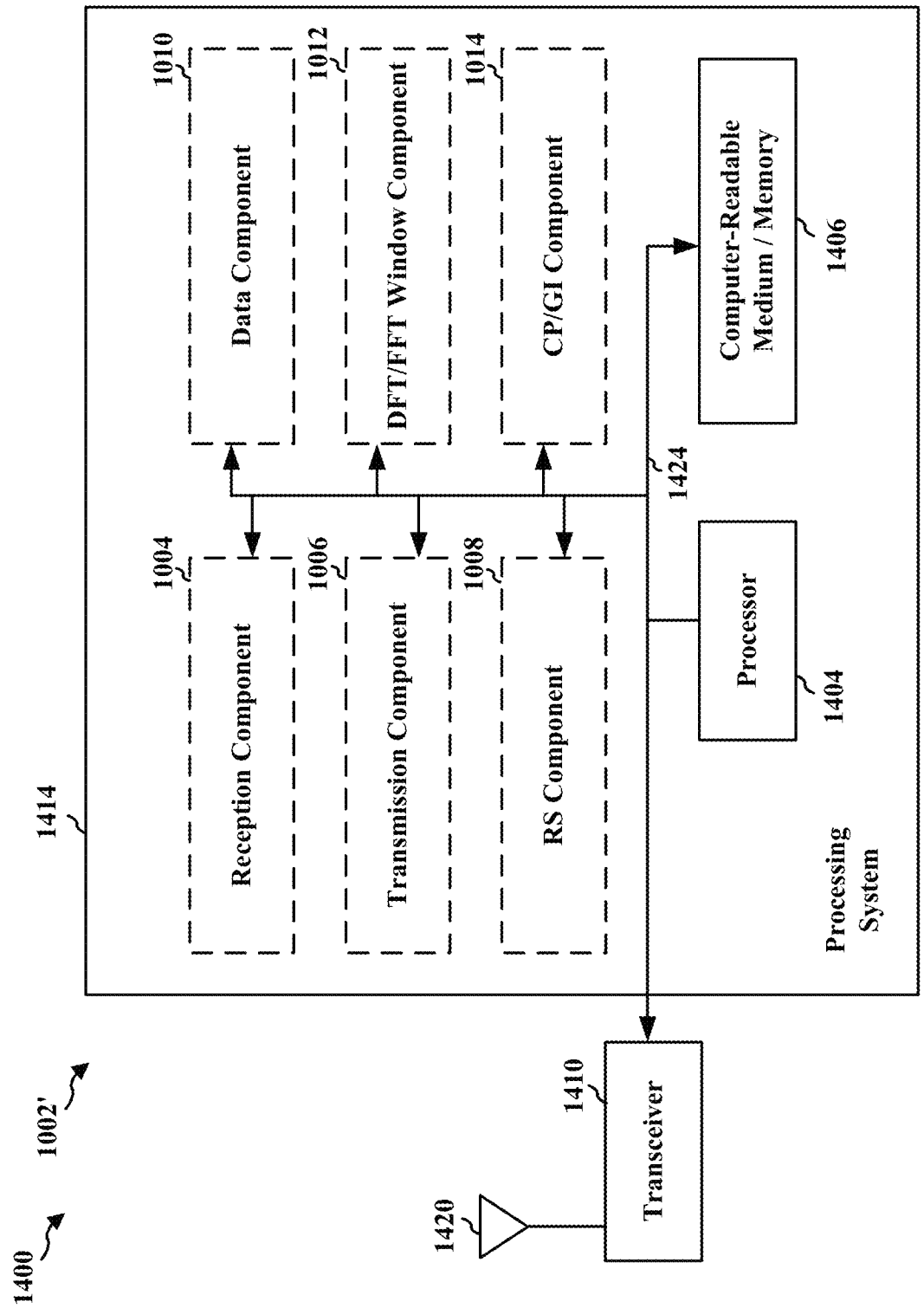
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a downlink transmission comprising data based on a single carrier waveform without a cyclic prefix or a guard interval (e.g., 1304, 1310, 1312), means for processing the data based on overlapping FFT windows (e.g., 1312, 1310), and means for receiving a reference signal based on the single carrier waveform in reference signal symbols having at least one of a cyclic prefix and a guard interval (e.g., 1304, 1308, 1314, 1312). The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitter based on a mixed symbol structure, comprising:
    transmitting a reference signal to a receiver based on a single carrier waveform in reference signal symbols using at least one of a cyclic prefix and a guard interval; and
    transmitting data to the receiver based on the single carrier waveform without the cyclic prefix or the guard interval, wherein the data is based on input data processed using overlapping Fast Fourier Transform (FFT) windows.

2. The method of claim 1, wherein the data is transmitted in data symbols without the cyclic prefix or the guard interval.

3. The method of claim 1, wherein the reference signal comprises a Demodulation Reference Signal (DMRS).

4. The method of claim 1, wherein the single carrier waveform comprises DFT-Spread-Frequency-Division-Multiplexing (DFT-s-FDM).

5. The method of claim 1, wherein the single carrier waveform comprises Single Carrier-Quadrature Amplitude Modulation (SC-QAM).

6. The method of claim 1, wherein a first FFT window comprises the input data comprised in a second, adjacent FFT window.

7. The method of claim 1, wherein an amount of overlap between the FFT windows is configurable by the transmitter or the receiver.

8. An apparatus for wireless communication at a transmitter based on a mixed symbol structure, comprising:

a memory, and
at least one processor coupled to the memory and configured to:
transmit a reference signal to a receiver based on a single carrier waveform in reference signal symbols using at least one of a cyclic prefix and a guard interval; and
transmit data to the receiver based on the single carrier waveform without the cyclic prefix or the guard interval, wherein the data is based on input data processed using overlapping Fast Fourier Transform windows.

9. The apparatus of claim 8, wherein the data is transmitted in data symbols without the cyclic prefix or the guard interval.

10. The apparatus of claim 8, wherein the single carrier waveform comprises DFT-Spread-Frequency-Division-Multiplexing (DFT-s-FDM).

11. The apparatus of claim 8, wherein the single carrier waveform comprises Single Carrier-Quadrature Amplitude Modulation (SC-QAM).

12. The apparatus of claim 8, wherein the reference signal comprises a Demodulation Reference Signal (DMRS).

13. The apparatus of claim 8, wherein a first FFT window comprises the input data comprised in a second, adjacent FFT window, and wherein an amount of overlap between the FFT windows is configurable by the transmitter or the receiver.

14. A method of wireless communication at a receiver based on a mixed symbol structure, comprising:
receiving a reference signal based on a single carrier waveform in reference signal symbols having at least one of a cyclic prefix and a guard interval;
receiving a transmission in data symbols comprising data based on the single carrier waveform without the cyclic prefix or the guard interval; and
processing the reference signal and the data, wherein the data is processed based on overlapping Fast Fourier Transform (FFT) windows.

15. The method of claim 14, wherein the reference signal comprises a Demodulation Reference Signal (DMRS).

16. The method of claim 14, wherein a first FFT window comprises the data comprised in a second, adjacent FFT window.

17. The method of claim 14, wherein an amount of overlap between the FFT windows is configurable by the receiver or a transmitter.

18. The method of claim 17, wherein the amount of overlap is based on a level of inter-symbol interference for the transmission.

19. The method of claim 17, wherein the amount of overlap between the FFT windows configured by the receiver to process the received data is configured independently from a second amount of overlap configured by the transmitter.

20. The method of claim 14, wherein the single carrier waveform comprises Discrete Fourier Transform-Spread-Frequency-Division-Multiplexing (DFT-s-FDM).

21. The method of claim 14, wherein the single carrier waveform comprises Single Carrier-Quadrature Amplitude Modulation (SC-QAM).

22. An apparatus for wireless communication at a receiver based on a mixed symbol structure, comprising:
a memory; and
at least one processor coupled to the memory and configured to:
receive a reference signal based on a single carrier waveform in reference signal symbols having at least one of a cyclic prefix and a guard interval;
receive a transmission in data symbols comprising data based on the single carrier waveform without the cyclic prefix or the guard interval; and
process the reference signal and the data, wherein the data is processed based on overlapping Fast Fourier Transform (FFT) windows.

23. The apparatus of claim 22, wherein a first FFT window comprises the data comprised in a second, adjacent FFT window.

24. The apparatus of claim 22, wherein an amount of overlap between the FFT windows is configurable by the receiver or a transmitter.

25. The apparatus of claim 24, wherein the amount of overlap is based on a level of inter-symbol interference for the transmission.

26. The apparatus of claim 24, wherein the amount of overlap between the FFT windows configured by the receiver to process the received data is configured independently from a second amount of overlap configured by the transmitter.

27. An apparatus for wireless communication at a transmitter based on a mixed symbol structure, comprising:
means for generating data by processing input data using overlapping Fast Fourier Transform (FFT) windows; and
means for transmitting a reference signal to a receiver based on a single carrier waveform in reference signal symbols using at least one of a cyclic prefix and a guard interval, and transmitting the data to the receiver based on the single carrier waveform without the cyclic prefix or the guard interval.

28. The apparatus of claim 27, wherein the data is transmitted in data symbols without the cyclic prefix or the guard interval.

29. An apparatus for wireless communication at a receiver based on a mixed symbol structure, comprising:
means for receiving a reference signal based on a single carrier waveform in reference signal symbols having at least one of a cyclic prefix and a guard interval, and receiving a transmission in data symbols comprising data based on the single carrier waveform without the cyclic prefix or the guard interval; and
means for processing the reference signal and the data, wherein the data is processed based on overlapping Fast Fourier Transform (FFT) windows.

30. The apparatus of claim 29, wherein a first FFT window comprises the data comprised in a second, adjacent FFT window.

31. The apparatus of claim 29, wherein an amount of overlap between the FFT windows is configurable by the receiver or a transmitter.

32. A non-transitory computer readable medium storing code for wireless communication, the code comprising instructions executable by a processor to:
transmit a reference signal to a receiver based on a single carrier waveform in reference signal symbols using at least one of a cyclic prefix and a guard interval; and
transmit data to the receiver based on the single carrier waveform without the cyclic prefix or the guard interval, wherein the data is based on input data processed using overlapping Fast Fourier Transform (FFT) windows.

33. A non-transitory computer readable medium storing code for wireless communication, the code comprising instructions executable by a processor to:
- receive a reference signal based on a single carrier waveform in reference signal symbols having at least one of a cyclic prefix and a guard interval;
- receive a transmission in data symbols comprising data based on the single carrier waveform without the cyclic prefix or the guard interval; and
- process the reference signal and the data, wherein the data is processed based on overlapping Fast Fourier Transform (FFT) windows.

* * * * *